United States Patent
Yu et al.

(10) Patent No.: US 6,968,833 B2
(45) Date of Patent: Nov. 29, 2005

(54) DIAGNOSTIC SYSTEM FOR CATALYTIC CONVERTER USING EXHAUST GAS RECIRCULATION SYSTEM THAT CAN DETECT EXHAUST PRESSURE BUILDUP

(75) Inventors: Songping Yu, Troy, MI (US); Michael J. Cullen, Northville, MI (US); Freeman C. Gates, Bloomfieldhills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 10/816,156

(22) Filed: Mar. 31, 2004

(65) Prior Publication Data

US 2005/0217650 A1 Oct. 6, 2005

(51) Int. Cl.[7] ............................................. F02M 25/07
(52) U.S. Cl. .............................. 123/568.16; 73/118.2; 701/108; 60/311
(58) Field of Search ...................... 123/568.11, 568.16, 123/568.21; 701/102, 103, 108; 60/274, 60/276, 299, 311, 602, 605.2, 606; 181/230

(56) References Cited

U.S. PATENT DOCUMENTS

| | | | | |
|---|---|---|---|---|
| 5,368,005 | A | * 11/1994 | Kako | 123/568.16 |
| 5,376,762 | A | * 12/1994 | Kimberlin | 181/230 |
| 5,943,864 | A | * 8/1999 | Sumser et al. | 60/602 |
| 6,003,303 | A | * 12/1999 | Peter-Hoblyn et al. | 60/274 |
| 6,014,961 | A | 1/2000 | Gates | 123/568.21 |
| 6,138,504 | A | 10/2000 | Lewis et al. | 73/118.2 |
| 6,434,474 | B1 | 8/2002 | Kotwicki et al. | 701/108 |
| 6,459,985 | B1 | 10/2002 | Kotwicki et al. | 701/103 |
| 6,659,095 | B2 | 12/2003 | Kotwicki et al. | 123/690 |
| 6,732,522 | B2 * | 5/2004 | Wright et al. | 123/568.21 |
| 2001/0042370 | A1 * | 11/2001 | Ohta et al. | 60/274 |
| 2004/0019424 | A1 * | 1/2004 | Beauerle et al. | 701/102 |

* cited by examiner

Primary Examiner—Willis R. Wolfe, Jr.
(74) *Attorney, Agent, or Firm*—Allan J. Lippa; Alleman Hall McCoy Russell & Tuttle LLP

(57) ABSTRACT

A method is described for detecting exhaust pressure buildup in an engine's exhaust system using information from an exhaust gas recirculation system having a valve.

27 Claims, 4 Drawing Sheets

DIAGNOSTIC SYSTEM FOR CATALYTIC CONVERTER USING EXHAUST GAS RECIRCULATION SYSTEM THAT CAN DETECT EXHAUST PRESSURE BUILDUP

TECHNICAL FIELD

The field of the invention relates to engine systems having exhaust gas recirculation systems and exhaust catalytic converters.

BACKGROUND AND SUMMARY

Various approaches can be used for detecting exhaust pressure buildup in an engine exhaust system, such as exhaust pressure sensors measuring pressure differential across an emission control device.

However, the inventors herein have recognized that such an approach may require additional sensors that can add to system cost.

Further, the inventors herein have recognized that it may be possible to provide the desired detection using already available information, such as information from an exhaust gas recirculation system.

In one example, advantages over prior approaches are provided by a method for detecting pressure buildup in an exhaust passage of an internal combustion engine having an emission control device and an exhaust gas recirculation system with an exhaust valve. The method comprises:

moving the exhaust valve in the exhaust gas recirculation system to a preselected open position; and estimating exhaust pressure buildup based on manifold pressure and an indication of pressure in the exhaust gas recirculation system.

In another aspect, it includes a method for detecting pressure buildup in an exhaust passage of an internal combustion engine having an emission control device and an exhaust gas recirculation system with an exhaust valve and a sensor, comprising:

detecting exhaust pressure buildup based information from the senor in the exhaust gas recirculation system.

By utilizing an exhaust gas recirculation system, it may be possible to provide the desired diagnostics with sufficient accuracy, without requiring additional exhaust gas sensors. Although, in one example the approach herein can be used in addition to other sensors to increase detection accuracy.

An advantage of the invention is improved degradation detection.

BRIEF DESCRIPTION OF DRAWINGS

The advantages described herein will be more fully understood by reading an example of an embodiment, referred to herein as the Detailed Description, when taken alone or in combination with reference to the drawings wherein.

DETAILED DESCRIPTION

Figure 1:
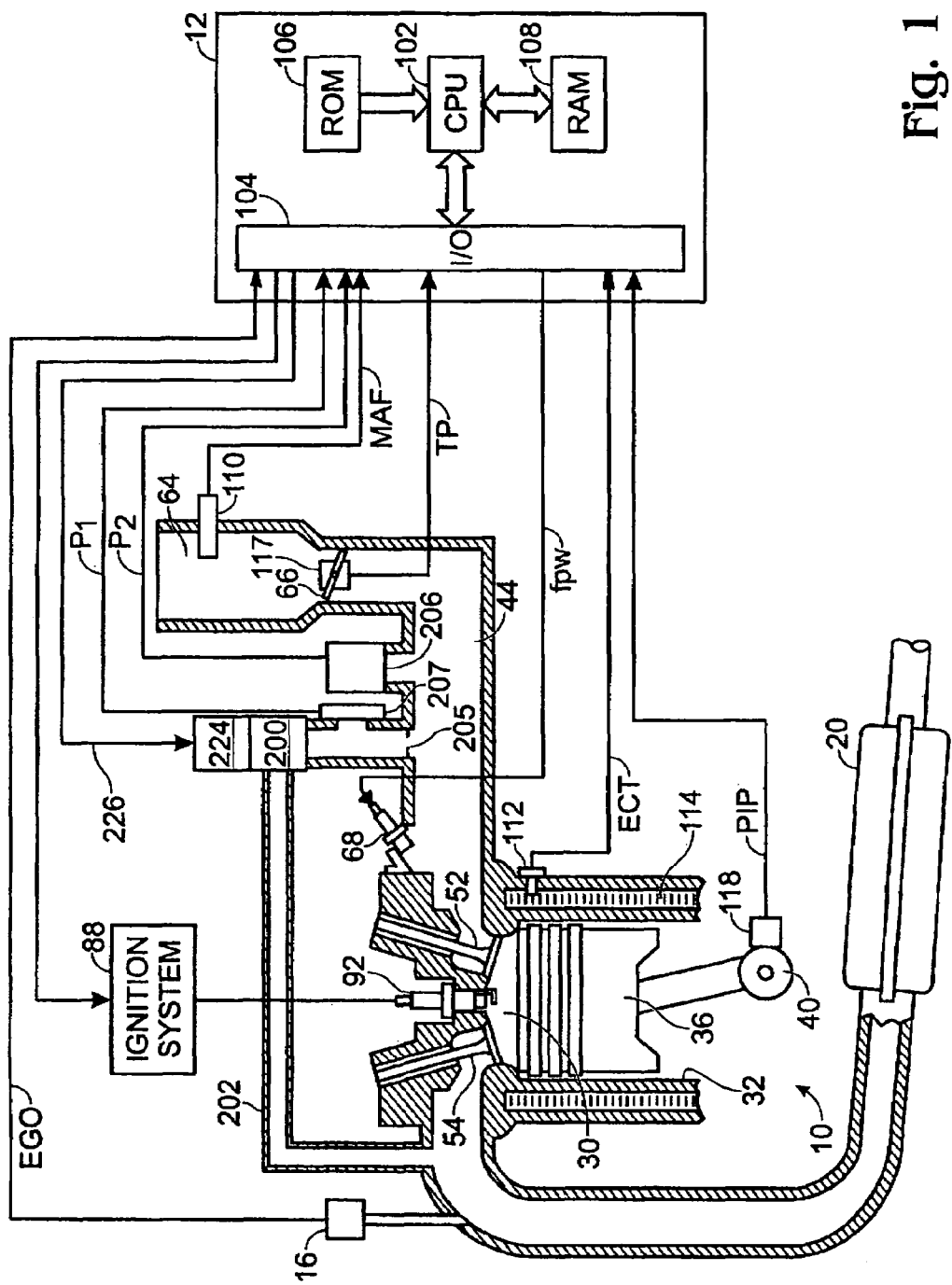
FIG. 1 is a block diagram of an engine.

Internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Combustion chamber 30 communicates with intake manifold 44 and exhaust manifold 48 via respective intake valve 52 and exhaust valve 54. Exhaust gas oxygen sensor 16 is coupled to exhaust manifold 48 of engine 10 upstream of emission control device 20, which can catalytic converter 20.

Intake manifold 44 communicates with throttle body 64 via throttle plate 66. Intake manifold 44 is also shown having fuel injector 68 coupled thereto for delivering fuel in proportion to the pulse width of signal (fpw) from controller 12. Fuel is delivered to fuel injector 68 by a conventional fuel system (not shown) including a fuel tank, fuel pump, and fuel rail (not shown). Engine 10 further includes conventional distributorless ignition system 88 to provide ignition spark to combustion chamber 30 via spark plug 92 in response to controller 12. In the embodiment described herein, controller 12 is a conventional microcomputer including: microprocessor unit 102, input/output ports 104, electronic memory chip 106, which is an electronically programmable memory in this particular example, random access memory 108, and a conventional data bus.

Controller 12 receives various signals from sensors coupled to engine 10, in addition to those signals previously discussed, including: measurements of inducted mass air flow (MAF) from mass air flow sensor 110 coupled to throttle body 64; engine coolant temperature (ECT) from temperature sensor 112 coupled to cooling jacket 114; a measurement of manifold pressure (MAP) from manifold pressure sensor 116 coupled to intake manifold 44; a measurement of throttle position (TP) from throttle position sensor 117 coupled to throttle plate 66; and a profile ignition pickup signal (PIP) from Hall effect sensor 118 coupled to crankshaft 40 indicating and engine speed (N).

Note that engine 10 can also be a direct injection engine where fuel injector 68 is located to directly inject fuel into combustion chamber 30, thereby bypassing valve 52.

Note also that in an alternative embodiment, engine 10 can be a diesel engine and device 20 can be a particulate filter.

Figure 2:
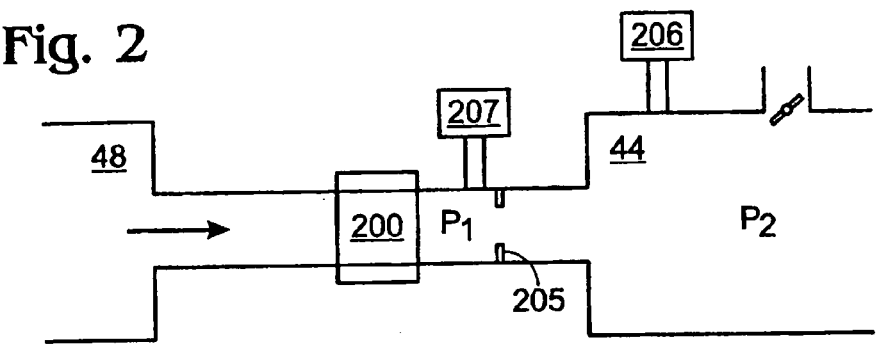
FIG. 2 is a schematic diagram of the EGR system.

As further illustrated in FIG. 2, exhaust gas is delivered to intake manifold 44 by an EGR tube 202 communicating with exhaust manifold 48, EGR valve assembly 200, and EGR orifice 205. Alternatively, tube 202 could be an internally routed passage in the engine that communicates between exhaust manifold 48 and intake manifold 44. Pressure sensor 206 communicates with EGR tube 202 between valve assembly 200 and orifice 205. Pressure sensor 207 communicates with intake manifold 44. Stated another way, exhaust gas travels from exhaust manifold 44 first through valve assembly 200, then through EGR orifice 205, to intake manifold 44. EGR valve assembly 200 can then be said to be located upstream of orifice 205.

An example EGR valve assembly 200 with vacuum regulator 224 is shown below in FIG. 6.

Also, pressure sensor 206 can be either absolute pressure sensor or a gauge pressure sensor. Further, pressure sensor 207 can be either absolute pressure sensor or a gauge pressure sensor. Further yet, pressure sensor 206 can be an absolute pressure sensor, while pressure sensor 207 can be gauge pressure sensor. Further still, pressure sensor 207 can be replaced by a differential pressure sensor, which measures the differential pressure across orifice 205.

Sensors 206 and 207 can thus provide, in one example, a measurement of manifold pressure (MAP) and pressure drop across orifice 205 (DELPR) to controller 12. Signals MAP and DP can then be used to calculate and control EGR flow.

EGR valve assembly 200 has a valve position (not shown) for controlling a variable area restriction in EGR tube 202, which thereby controls EGR flow. EGR valve assembly 200 can either minimally restrict EGR flow through tube 202 or completely restrict EGR flow through tube 202. Vacuum regulator 224 is coupled to EGR valve assembly 200. Vacuum regulator 224 receives actuation signal (226) from controller 12 for controlling valve position of EGR valve assembly 200. In a one embodiment, EGR valve assembly 200 is a vacuum actuated valve. However, any type of flow control valve may be used such as, for example, an electrical solenoid powered valve or a stepper motor powered valve.

The above example thus includes a downstream orifice 205 relative to valve assembly 200.

In an alternative embodiment, orifice 205 is located upstream of valve assembly 200, and a differential pressure sensor is located upstream of assembly 200 to measure and provide an indication of the differential pressure across the orifice. From this, EGR flow can be calculated and used for feedback control via the valve assembly 200. In this upstream orifice type system, pressure sensor 206 is optionally used. Further, in some cases, an estimate of manifold pressure can be formed using the mass air flow sensor 110, along with engine speed and various other parameters. For example, charge per cylinder (air and EGR) can be used, along with mapped slope and offset parameters to estimate manifold pressure at a given set of operating conditions. Further, temperature effects can be included, if desired. This estimated manifold pressure can be termed (INF_MAP). Various other approaches are known for estimating manifold pressure and can also be used.

The following control routines included herein can be used with various engine configurations, such as those described above. As will be appreciated by one of ordinary skill in the art, the specific routine described below in the flowchart(s) may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the features and advantages of the example embodiments of the invention described herein, but is provided for ease of illustration and description. Although not explicitly illustrated, one of ordinary skill in the art will recognize that one or more of the illustrated steps or functions may be repeatedly performed depending on the particular strategy being used. Further, the flowchart(s) graphically represents code to be programmed into the computer readable storage medium in controller 12.

Figure 3:
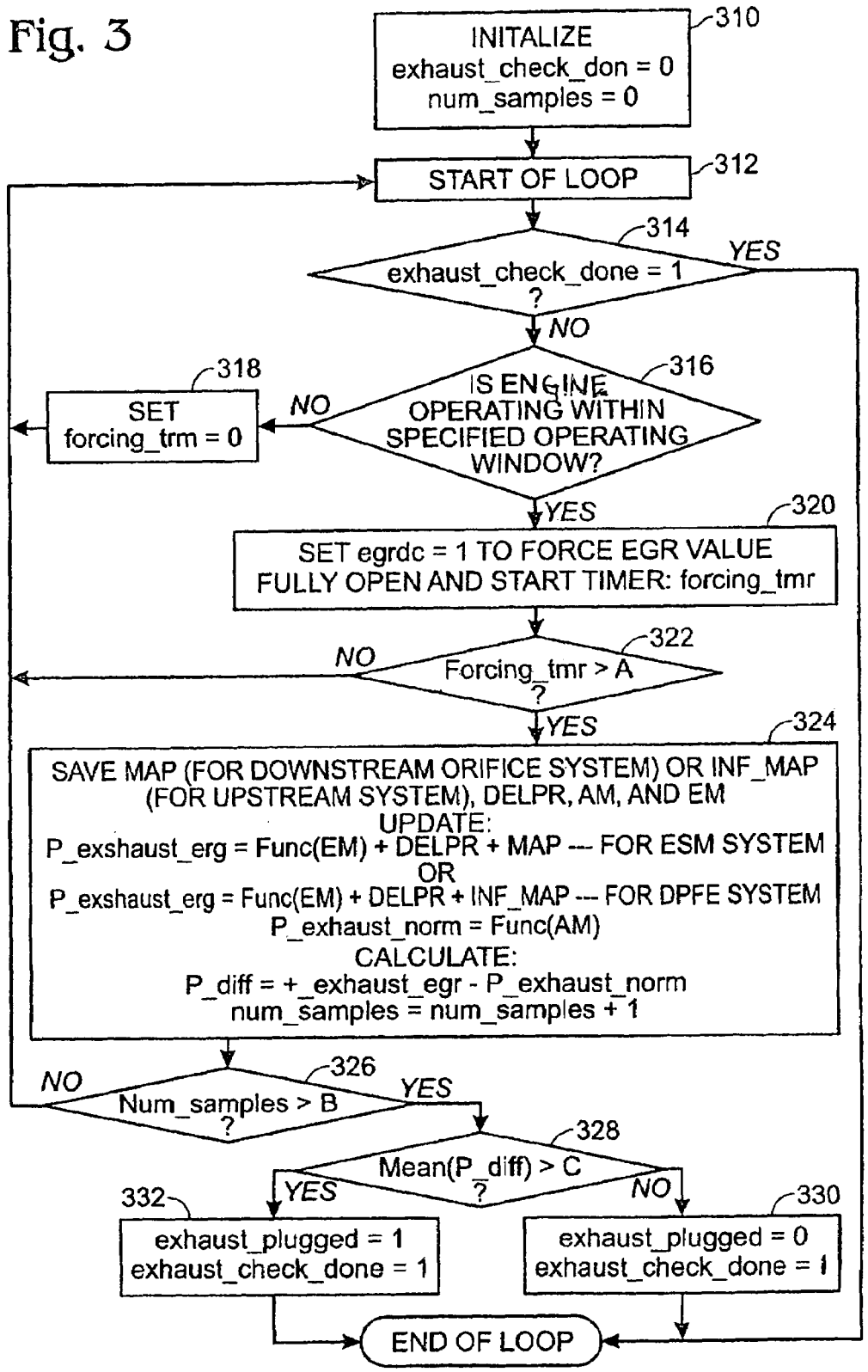
FIG. 3 is a high level flowchart of various routines for detecting exhaust pressure buildup and taking action in response thereto.

Referring now to FIG. 3, a routine is described for identifying increased blockage (and/or pressure buildup) in the exhaust system such as in the emission control device. In one example, the routine identifies a plugged three-way catalyst cause by contaminated fuel. The plugged engine exhaust system may cause various concerns for automotive vehicles. For example, excessive back pressure buildup can result in engine power loss, and in some cases, physically damage the engine system. This method provides a way to detect the back pressure buildup and to warn the operator before the buildup is excessive, or to take control action to reduce the buildup.

In an alternative embodiment, the routine identifies when a particulate filter of a diesel engine has trapped a selected amount of particulate and needs to be regenerated. Still other alternatives may also be applicable.

Figure 4:
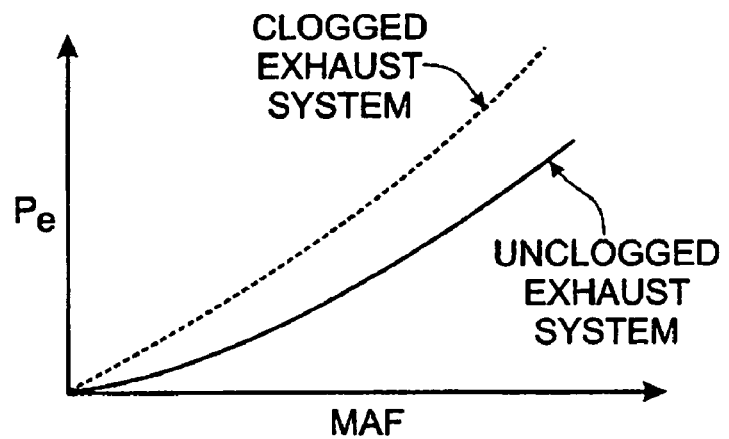
FIG. 4 is a graph illustrating flow performance of an exhaust system.

In general, the routine attempts to directly measure exhaust pressure, which can be coordinated to flow restriction using the mass air flow sensor, as illustrated in FIG. 4. Specifically, the routine forces the EGR valve to open substantially fully, thereby eliminating or reducing the effect on EGR position of variations in vacuum regulator 224. In other words, if a position sensor is not used (although one could be, if desired), valve position can be inferred from the amount of commanded vacuum to 224. However, due to interfering effects, this inference can have substantial errors. Therefore, by commanding the valve substantially fully open, these affects can be reduced, and measured pressure upstream of the orifice and/or valve are more representative of exhaust pressure since a smaller pressure drop occurs across the valve. Further, by substantially fully opening the valve, pressure drop across the valve is minimized and a more accurate estimate can be obtained by reducing the effect of EGR flow on the estimate.

Thus, one reason to force the EGR valve fully open is to reduce the effects of the uncertainty with the vacuum driven EGR system. However, with other systems having a more precise EGR valve position control, such as stepper motor systems, the fully open position may not be necessary. Rather, from known valve position and EGR flow, the pressure drop across the valve can be determined in mapping process. (Pvalve=table(Valve_position, EGR_flow)). As such, the approach herein can be used with stepper EGR systems, electromechanical EGR systems, etc.

In one approach, the EGR is purposely forced to a selected location (such as fully open) by modifying EGR schedule under certain engine speed and load (e.g. at 2500 rpm and 0.55 load). In testing, this modification resulted in little or no noticeable driveability impact.

However, in the case of a stepper EGR, the valve is not purposely forced to a fully open position, but rather the valve is simply moved to selected locations based on the desired amount of EGR flow, and the pressure drop across the valve is estimated from mapping data and used to estimate the exhaust pressure.

The exhaust pressure can then be estimated as follows (for the downstream orifice type system) as:

Pexhaust=ΔPvalve+DELPR+MAP,

Where:

DELPR is the delta pressure across EGR orifice 205, measured directly by sensors 206 and 207 (or a differential pressure sensor, for example).

ΔPvalve is the delta pressure across EGR valve. With fully opened EGR valve, it is primarily a function of EGR flow mass (EM) and can be determined by engine mapping and stored in the processor 12.

MAP is the manifold absolute pressure, measured by sensor 206, for example.

Alternatively, for an upstream orifice system, exhaust pressure is estimate as:

Pexhaust=DELPR+ΔPvalve+inf_map

Where:

DELPR is the delta pressure across EGR orifice, measured directly by an EGR sensor.

ΔPvalve is the delta pressure across EGR valve. With fully opened EGR valve, it is primarily a function of EGR flow mass (EM) and can be determined by engine mapping and stored in the processor 12.

Inf_map is the Inferred Manifold Absolute Pressure, estimated from other parameters, such as MAF from sensor 110.

Figure 5:
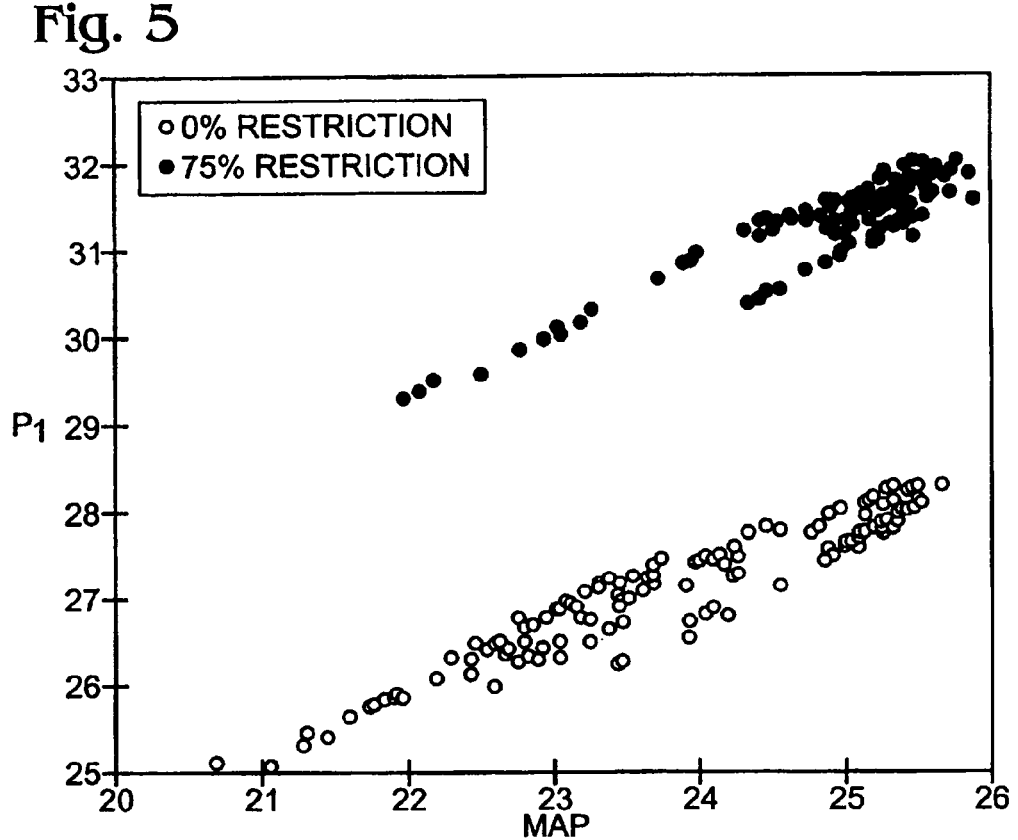
FIG. 5 is a graph illustrating example results of exhaust pressure buildup detection.

As illustrated by FIG. 5 showing data for a downstream orifice system with the modified EGR schedule discussed above to force the valve fully open for air masses (from MAF sensor 110) between 6.5 lb/min<AM<8.5 lb/min, clear separation between a plugged or partially plugged emission control device and an unplugged device is achieved. Further, narrowing the AM window further can reduce the scattering of the data distribution, if desired.

Referring now specifically to FIG. 3, a routine is described for detecting exhaust pressure buildup and taking action in response thereto.

First, in step 310, flags exhaust_check_done and num_samples are set to zero. Then, the routine continues to step 312, where the loop starts. Next, the routine continues to step 314, where the routine determines whether the flag exhaust_check_done has been set to 1. If so, the routine continues to end the loop. Alternatively, when the answer to step 314 is YES, the routine continues to step 316 where the routine determines whether the engine is operating in a specified operating window, such as in a desired air mass window and EGR is enabled as indicated above. However, other parameters can be used, such as time since engine start, exhaust temperature, engine temperature, engine speed, throttle position, etc. In particular, if throttle position is substantially fully open, EGR flow can be disabled.

If the answer to step 316 is NO, the routine continues to step 318 to set timer forcing_tmr to zero in step 318 and return to step 312.

If the to step 316 is YES, the routine continues to step 320 to set the valve duty cycle command (egrdc, 226) to its maximum value (with 1 representing 100 duty cycle in this case). This forces the valve substantially fully open. Further, in step 320, the routine starts the timer forcing_tmr.

Then, in step 322, the routine determines whether the timer (forcing_tmr) is greater than a first calibratable value (A). If not, the routine returns to step 312. If so, the routine continues to step 324. In step 324, the routine performs the following:

(1) Saves the manifold pressure (measure or estimated depending on the type of orifice location), along with the differential pressure, mass air flow, and EGR flow.
(2) Updates an estimate of the exhaust pressure (upstream of the emission control device) using this data and an equation that depends on the orifice location type.
(3) Calculates a pressure error (P_diff) based on the estimate of the exhaust pressure from (2) and an expected pressure at the current conditions (P_exhaust_norm). As indicate above, the expected pressure can be calculated from the mass air flow and mapping data of an emission control device in a known condition (e.g., unplugged).
(4) Updates the number of samples (num_samples). A predetermined number of samples (B) can be used to reduce estimation errors, if desired.

Then, the routine continues to step 326 to determine whether the number of samples (num_samples) is greater than a second calibratable value (B). If not, the routine returns to step 312. If so, the routine continues to step 328. Next, the routine continues to step 328 to determine whether the average of the estimated pressure difference (P_diff) from all of (or a portion of, or the most recent set of) sampled values is greater than a third calibratable value (C). If not, the routine returns to step 330 to set flags exhaust_plugged to zero and exhaust_check_done to 1, indicating that a check has been completed and degradation or exhaust pressure buildup was not detected.

Alternative, if the answer to step 328 is YES, the routine continues to step 332 to set flags exhaust_plugged to 1 and exhaust_check_done to 1, indicating that a check has been completed and degradation or exhaust pressure buildup was detected. Further, default operation can be instituted. For example, in response, the driver can be notified. Alternative, if using a DPF, for example, control action can be taken to regenerate the emission control device. For example, the exhaust temperature can be raised to burn stored soot in the DPF.

Note that in one alternative example, the pressure drop across the fully opened EGR valve can be assumed negligible during selected conditions (e.g., mid to high manifold pressure conditions), and the exhaust pressure can be estimated from the manifold pressure and differential pressure directly, without estimating EGR flow from engine mapping conditions.

As illustrated above, a delta pressure EGR system (including both upstream and downstream orifice systems) can be used to detect pressure buildup in the exhaust so that corrective action can be taken (e.g., purging a DPF, or notifying the vehicle operator). In one approach, the system measures the pressure drop across the EGR orifice and determines the amount of EGR flow (EGR Mass or EM) into intake manifold of engine, which provides information to estimate the pressure in the exhaust system, as described above. In one example, the exhaust pressure in exhaust system is the sum of the delta pressure across EGR valve, the delta pressure across EGR orifice, and the absolute pressure in intake manifold. With a substantially fully open EGR valve, the pressure drop across the valve is primarily a function of EGR flow Mass (EM). This relationship can be determined in engine mapping processes, or estimated on-line. The absolute pressure in intake manifold is either directly measured or inferred from Mass Air Flow (MAF) readings. The nominal exhaust pressure is mainly a function of Air Mass (AM) and can also be determined in engine mapping. Then, by comparing the estimated exhaust pressure with its nominal value, the exhaust pressure buildup can be detected.

Figure 6:
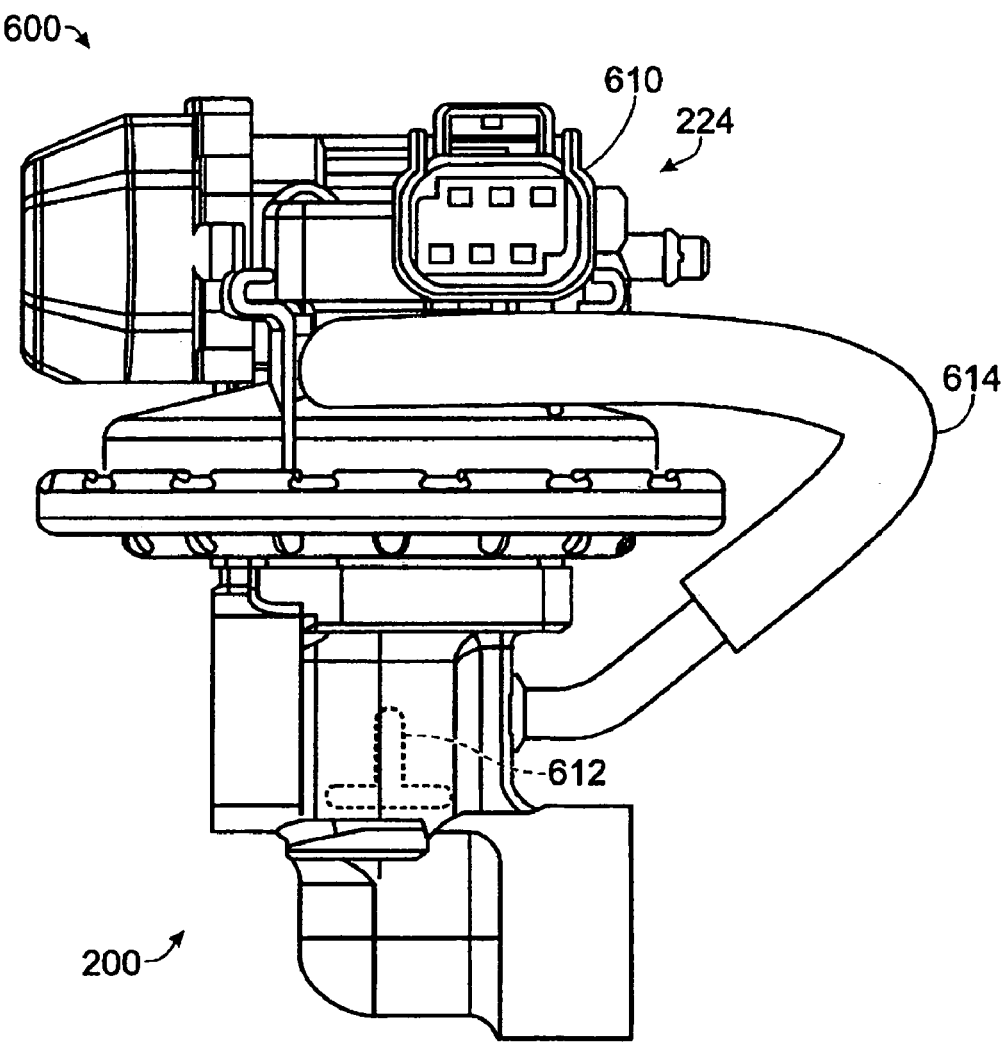
FIG. 6 is a detailed view of a vacuum actuated EGR valve.

Referring now to FIG. 6, an example EGR system 600 is illustrated. The system includes the vacuum regulate 224 and valve assembly 200. Further, an electrical connector 610 is shown for providing signals to and receiving signals from controller. For example, system 600 includes a pressure sensor for measuring pressure between the orifice 205 and the valve pintle 612. Further, tube 614 is shown for providing a tap for measuring this pressure to the sensor. An alternative EGR system is described in U.S. Pat. No. 6,014,961, which is incorporated by reference herein.

It will be appreciated that the configurations and routines disclosed herein are exemplary in nature, and that these specific embodiments are not to be considered in a limiting sense, because numerous variations are possible. For example, the above converter technology can be applied to V-6, I-4, I-6, V-12, opposed 4, and other engine types.

The subject matter of the present disclosure includes all novel and nonobvious combinations and subcombinations of the various systems and configurations, and other features, functions, and/or properties disclosed herein.

The following claims particularly point out certain combinations and subcombinations regarded as novel and non-obvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

We claim:

1. A method for detecting pressure buildup in an exhaust passage of an internal combustion engine having an emission control device and an exhaust gas recirculation system with an exhaust valve, comprising:
   moving the exhaust valve in the exhaust gas recirculation system to a preselected open position;
   estimating exhaust pressure buildup based on manifold pressure and an indication of pressure in the exhaust gas recirculation system.

2. The method of claim 1 wherein said preselected open position is a substantially fully open position.

3. The method of claim 2 wherein said indication of pressure in the exhaust gas recirculation system includes a differential pressure across an orifice in the exhaust gas recirculation system.

4. The method of claim 3 wherein said orifice is upstream of the exhaust valve.

5. The method of claim 3 wherein said orifice is downstream of the exhaust valve.

6. The method of claim 1 wherein said manifold pressure is measured from a manifold pressure sensor.

7. The method of claim 1 wherein said manifold pressure is estimated from a mass air flow sensor.

8. The method of claim 1 wherein the emission control device is a three way catalyst.

9. The method of claim 1 wherein the emission control device is a particulate filter.

10. The method of claim 9 further comprising raising exhaust gas temperature to regenerate the particulate filter based on said estimated exhaust pressure buildup.

11. The method-of claim 1 further comprising taking default action in response to said estimated exhaust pressure buildup.

12. A system for an internal combustion engine, comprising:
   an emission control device in an exhaust passage of the engine;
   an exhaust gas recirculation system with an exhaust valve coupled between an intake and exhaust manifold of the engine, the exhaust gas recirculation system having at least a valve, an orifice, and a pressure sensor providing at least a partial indication of differential pressure across said orifice; and
   a computer readable storage medium having code for moving said exhaust valve in the exhaust gas recirculation system to a preselected open position; and code for detecting exhaust pressure buildup based on said pressure sensor and an indication of manifold pressure.

13. The system of claim 12 wherein said orifice is upstream of the valve.

14. The system of claim 12 wherein said orifice is downstream of the valve.

15. The system of claim 12 wherein said pressure sensor is a differential pressure sensor.

16. A system for an internal combustion engine, comprising:
   an emission control device in an exhaust passage of the engine;
   an intake manifold pressure sensor;
   an exhaust gas recirculation system with an exhaust valve coupled between an intake and exhaust manifold of the engine, the exhaust gas recirculation system having at least a valve, an orifice downstream of said valve, and a pressure sensor indicating pressure between said valve and said orifice; and
   a computer readable storage medium having code for moving said exhaust valve in the exhaust gas recirculation system to a preselected open position; and code for detecting exhaust pressure buildup based on said intake manifold pressure sensor and said exhaust gas recirculation system pressure sensor.

17. The system of claim 16 wherein said emission control device is a particulate filter.

18. The system of claim 16 wherein said computer readable storage medium code for moving said exhaust valve in the exhaust gas recirculation system to said preselected open position includes moving said valve to a substantially fully open position.

19. The system of claim 18 wherein said computer readable storage medium further comprises code for moving said exhaust valve to said substantially fully open position under a selected air amount conditions.

20. The system of claim 16 wherein said intake manifold pressure sensor is an absolute pressure sensor.

21. A method for detecting pressure buildup in an exhaust passage of an internal combustion engine having an emission control device and an exhaust gas recirculation system with an exhaust valve and a sensor, comprising:
   detecting exhaust pressure buildup based on information from the sensor in the exhaust gas recirculation system.

22. The method of claim 21 further comprising performing said detection while said valve is located in an open position.

23. The method of claim 22 said open position is a substantially fully open position.

24. The method of claim 23 where the exhaust gas recirculation system further comprises an orifice, wherein said orifice is upstream of the exhaust valve.

25. The method of claim 23 where the exhaust gas recirculation system further comprises an orifice, wherein said orifice is downstream of the exhaust valve.

26. The method of claim 21 wherein the emission control device is a three way catalyst.

27. The method of claim 21 wherein the emission control device is a particulate filter.

* * * * *